US005491476A

United States Patent [19]
DiBella

[11] Patent Number: 5,491,476
[45] Date of Patent: Feb. 13, 1996

[54] MAGNETICALLY TRIGGERED ELAPSED TIME INDICATOR

[76] Inventor: James A. DiBella, 80 Lowden Point Rd., Rochester, N.Y. 14612

[21] Appl. No.: 130,490

[22] Filed: Oct. 1, 1993

[51] Int. Cl.$^6$ .............................. G08G 1/01; G08B 23/00
[52] U.S. Cl. ........................ 340/933; 340/984; 340/323 R
[58] Field of Search ..................................... 340/933, 936, 340/670, 309.5, 984, 985, 323 R; 324/173, 174, 178, 179; 440/113; 441/136

[56] References Cited

U.S. PATENT DOCUMENTS

| | | | |
|---|---|---|---|
| 3,127,768 | 4/1964 | Mason | 73/167 |
| 3,497,770 | 2/1970 | Nellis | 317/5 |
| 3,546,696 | 12/1970 | Waters et al. | 340/323 R |
| 4,392,122 | 7/1983 | Hocken | 340/323 |

*Primary Examiner*—Edward L. Coles, Sr.
*Assistant Examiner*—Thomas D. Lee
*Attorney, Agent, or Firm*—J. Addison Mathews

[57] ABSTRACT

Apparatus for determining when a moving vehicle passes a fixed point characterized by a magnetic field. The apparatus includes first and second magnetic-field sensors spaced apart on the vehicle for producing first and second outputs when the sensors move in the magnetic field past the point. The outputs are validated based on the time span between the outputs and the spacing between the sensors. According to certain more specific features, the fixed point is a magnetic buoy, the vehicle is a boat expected to move past the buoy at a speed within an acceptable range, the first and second magnetic-field sensors are electrical coils spaced apart a known distance in the direction of movement, and the validating means uses the sensor spacing and the acceptable range for validating the outputs. According to other features, the elapsed time for the vehicle to travel between two fixed points is determined using only validated outputs. Measurement of elapsed time is initiated when a first set of acceptable outputs is identified and terminated when a second set of acceptable outputs is identified. A predetermined lower limit of the elapsed time is used to reject any outputs that occur before the lower limit, and a predetermined upper limit of elapsed time is used to terminate and reset the timer.

14 Claims, 7 Drawing Sheets

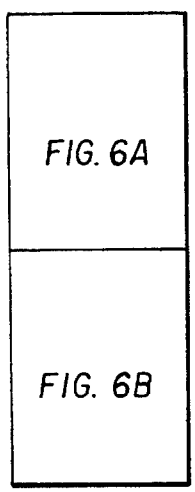
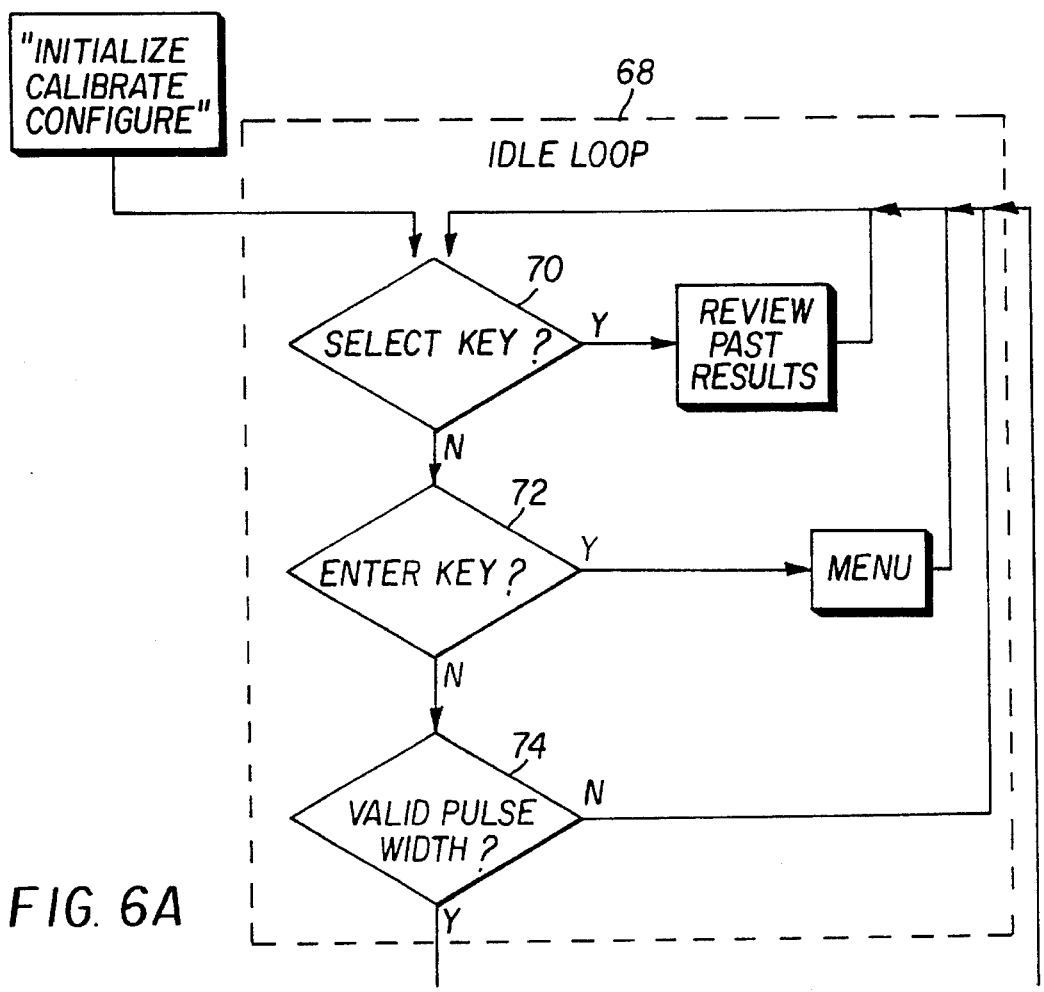

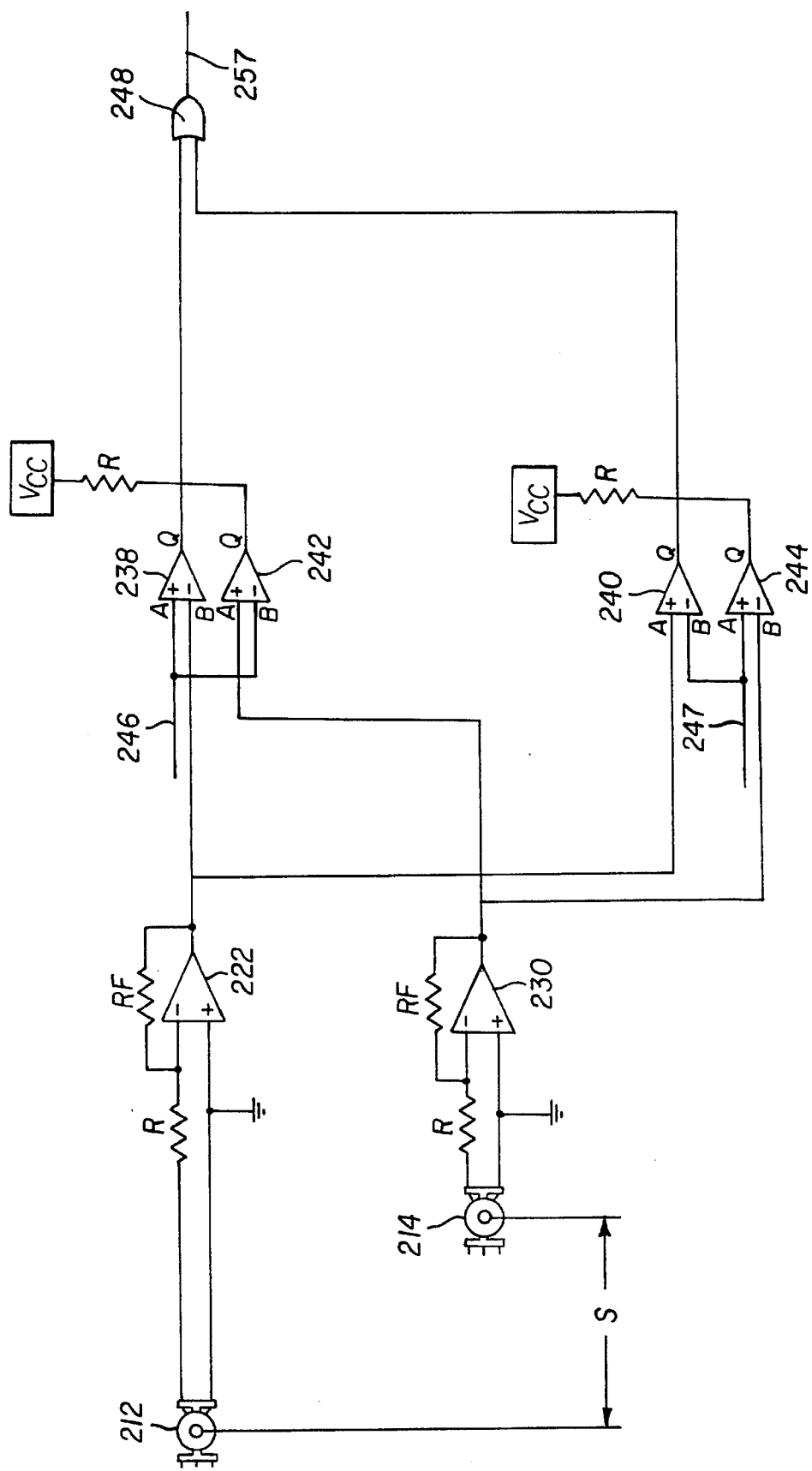

MAGNETICALLY TRIGGERED ELAPSED TIME INDICATOR

BACKGROUND OF THE INVENTION

1. Field of the Invention

The invention relates to magnetically triggered elapsed time indicators for use on moving vehicles, and more specifically to such indicators using validated output signals for initiating and terminating the measurement of elapsed time. Still more specific features relate to apparatus for determining the average speed of a boat moving through a course marked by magnetic buoys.

2. Description of the Prior Art

It is desirable in many competitive events to know onboard a moving vehicle the average speed of travel between fixed points. In water skiing events, such as slalom and jumping, for example, a towing boat is required to travel at speeds within relatively close tolerances between two rows of buoys that define the course. Elapsed times or average boat speeds are measured electronically to confirm the run is within the required tolerances and to validate compliance with the rules of competition. Similar requirements exist in motor racing, where the vehicle may travel in laps that return to a fixed point. Lap speeds, or the elapsed time taken to travel identified sections of the course, can provide competitive advantages, particularly when immediately available to the driver.

Timing devices for water skiing have evolved with the sport from simple stop watches to automated systems. It is common to mount magnets on buoys that mark the course, and to sense the resulting magnetic field with an electrical coil carried by the tow boat. The coil produces a signal when it moves in the field past each magnetic buoy. The signal from the first buoy starts a timer when the boat enters the course. The last buoy produces a similar signal at the end of the course and stops the timer to provide a measurement of the elapsed time for the boat to travel between the first and last buoys. Since the distance between the buoys is known, the elapsed time represents the average speed, which is compared to a permitted range to validate the run.

U.S. Pat. No. 4,392,122, issued to Redvers Hocken on Jul. 5, 1983, includes a history and description of existing practice. According to the Hocken disclosure, three of the buoys marking a slalom course are provided with magnets at entrance, exit and intermediate points along the course. Two timers are started when the boat passes the first buoy. One is stopped at the intermediate buoy and the other at the exit buoy. The second timer then provides an indication of average boat speed over the full length of the course, while the first timer permits mid-course corrections based on the average speed up to the intermediate buoy.

Hocken recognizes problems caused by extraneous magnetic fields emanating from the boats ignition and other electrical sources. The sensor carried by the boat preferably has directional properties aligned to maximize the influence of fields originating from the buoy-mounted magnets and to minimize the influence of extraneous fields. Directional properties are achieved by using an elongate coil including a magnetically permeable core extending from the ends of the coil.

PROBLEM SOLVED BY THE INVENTION

Devices that sense magnetic fields typically are designed for high gain at low frequencies. The high gain is preferred for recording the relatively weak signals that result from the movement of a vehicle past a reasonably strong permanent magnet, but it also is susceptible to false triggering from extraneous sources including the earth's magnetic field and electrical devices mentioned by Hocken.

The problem of false triggering is particularly troublesome in competitive water skiing. Common occurrences like wave action, rough water and boat wakes move the sensing devices, sometimes rapidly, in the earth's magnetic field. The frequency and amplitude of such events often is similar to the desired signal, causing a false trigger.

SUMMARY OF THE INVENTION

The invention is directed to overcoming one or more of the problems set forth above. Briefly summarized, according to one aspect of the invention, apparatus is provided for determining when a moving vehicle passes a fixed point characterized by a magnetic field. The apparatus includes first and second transducers spaced apart on the vehicle for producing first and second outputs when the transducers move in the magnetic field past the point. The outputs are validated based on the time span between the outputs and the spacing between the transducers. Simultaneous outputs, for example, are inconsistent with movement of the vehicle and are rejected.

According to certain more specific features of the invention, the fixed point is a magnet within a buoy, the vehicle is a boat expected to move past the buoy at a speed within a predetermined range, the first and second transducers are electrical coils spaced apart a known distance in the direction of movement, and the outputs are validated based on the transducer spacing and the predetermined range of speeds.

According to other features of the invention, the elapsed time for the vehicle to travel between two fixed points is determined using only validated outputs. Measurement of the elapsed time is initiated when a first set of acceptable outputs is identified and terminated when a second set of acceptable outputs is identified. A predetermined lower limit of the elapsed time is used to reject any outputs that occur before the lower limit, and the timer is stopped and reset when a predetermined upper limit is exceeded.

These and other features and advantages will be more clearly understood and appreciated from a review of the following detailed description of the preferred embodiment and appended claims, and by reference to the accompanying drawings.

ADVANTAGEOUS EFFECTS OF THE INVENTION

The invention eliminates false triggers by rejecting spurious signals that are inconsistent with movement of the vehicle within the predetermined speed ranges. Outputs are validated by using transducers that produce duplicate outputs from the same field. The outputs are essentially identical in frequency and amplitude, but must be displaced in time. Wave action, for example, might produce simultaneous output signals from both transducers as they move in the earth's magnetic field, but the outputs would be simultaneous and therefore rejected.

In accordance with more specific features, intermediate and exit output signals are accepted only when they occur within an expected time window that starts after a predicted lower limit consistent with the permitted speed tolerances.

In its most comprehensive embodiment, the invention provides highly automated and menu driven features for use in competitive water skiing events. Features include mode selection for automatic or manual timing, event selection for slalom, jumping and trick events, buoy location to accommodate an unconventional set-up, sensitivity adjustment for threshold calibration, and tolerance selection alternately defining wide or narrow tolerance ranges for amateur and professional events, respectively. Modem communication with a land based host computer through a cellular phone or radio transmitter permits instantaneous review by tournament judges.

BRIEF DESCRIPTION OF THE DRAWINGS

FIG. 8 is a schematic representation of an alternative embodiment with a reduced number of components.

DESCRIPTION OF THE PREFERRED EMBODIMENTS

Figure 1:
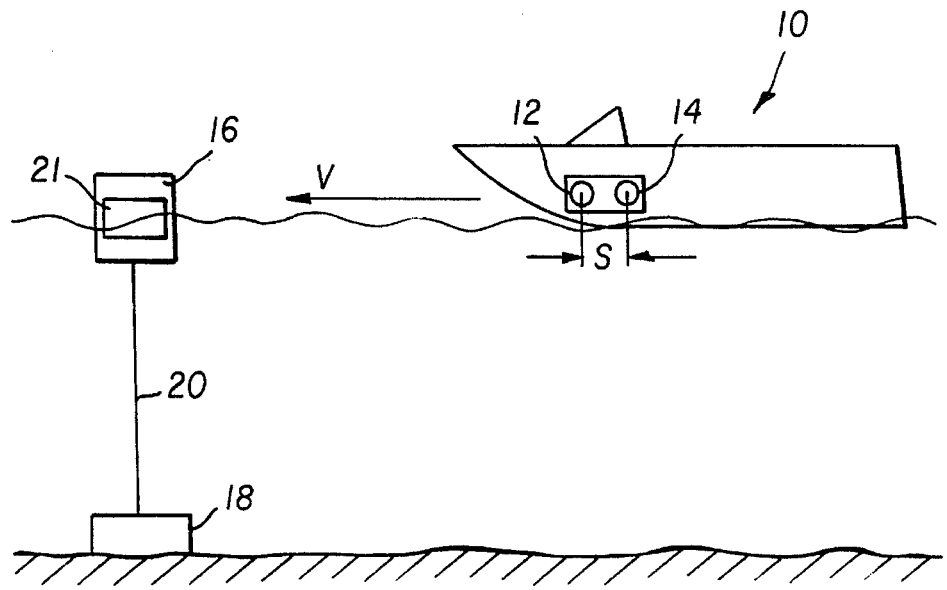
FIG. 1 is a schematic view of a magnetically triggered elapsed time indicator according to the invention, including spaced sensors for providing output signals when the sensors move in a magnetic field past a fixed point at the center of the field.
Figure 2:
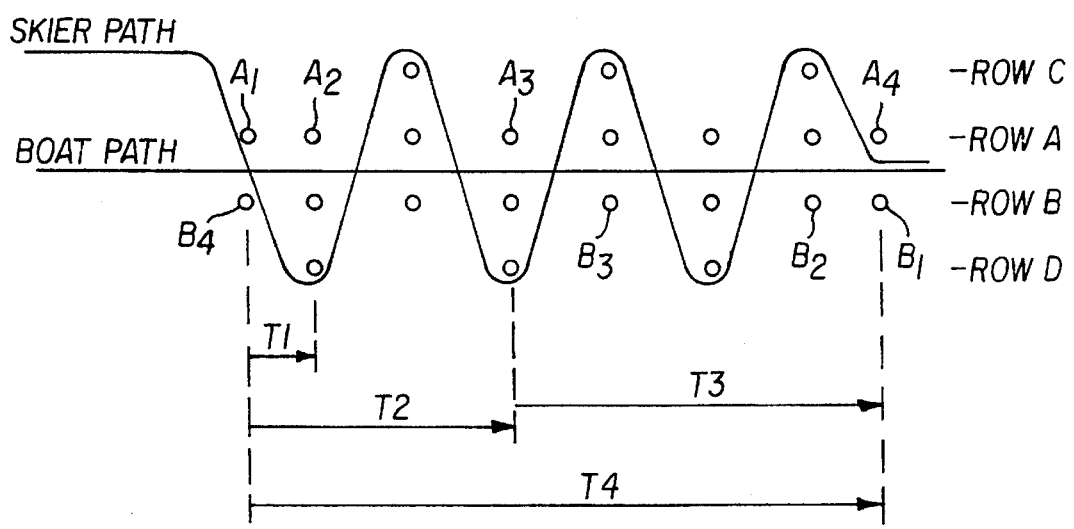
FIG. 2 is a schematic representation of a slalom course for water skiing including magnetic buoys at the entrance, intermediate and end points defining the course.

Referring now to a preferred embodiment of the invention, and first to FIGS. 1 and 2, a vehicle 10 is provided with first and second magnetic-field sensors 12 and 14 spaced a distance "S" longitudinally of the vehicle axis in the direction of travel. The vehicle in the preferred embodiment is a boat expected to travel within predetermined ranges of permissible speeds through a course defined by rows of buoys. The buoy 16 is representative of several buoys fixed in position along the course by anchors 18 and lines 20. The buoys are characterized by a magnetic field emanating from a permanent magnet 21 fixed to the buoy and having sufficient strength for detection by the sensors 12 and 14 within the ranges defined by the course.

FIG. 2 depicts the course and placement of the buoys including the magnetic buoys. Two rows of buoys, "Row A" and "Row B," define a straight line path for the boat to follow from the course entrance through its exit. A slalom skier, towed by the boat, follows approximately a sinusoidal path around third and fourth rows of buoys, "Row C" and "Row D." The course is traveled in both directions. When traveling to the right in FIG. 2, buoys "A1," "A2," "A3," and "A4" are magnetic, as described above. "A1," and "A4" define the beginning and end of the course, respectively. "A3" defines an intermediate position, and "A2" is used for an early indication of boat speed. Buoys "B1" through "B4" serve similar functions in the opposite direction. Elapsed times "T1," "T2," "T3," and "T4" represent the time for the vehicle to travel between the respective buoys as indicated.

Figure 3:
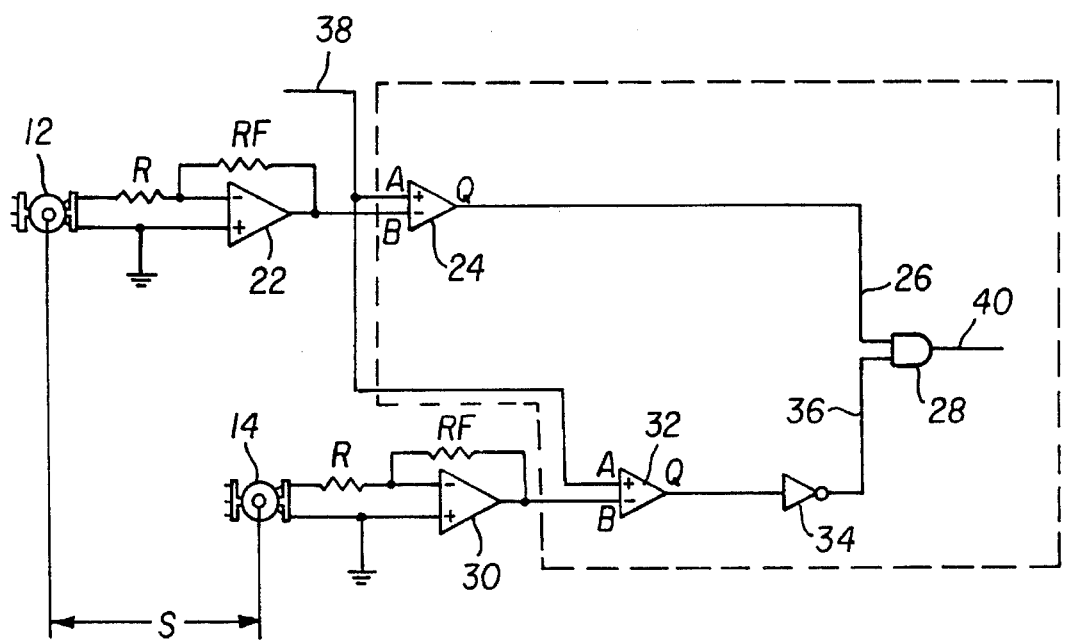
FIG. 3 is a schematic view of electrical components combined in a circuit according to the invention.
Figure 4:
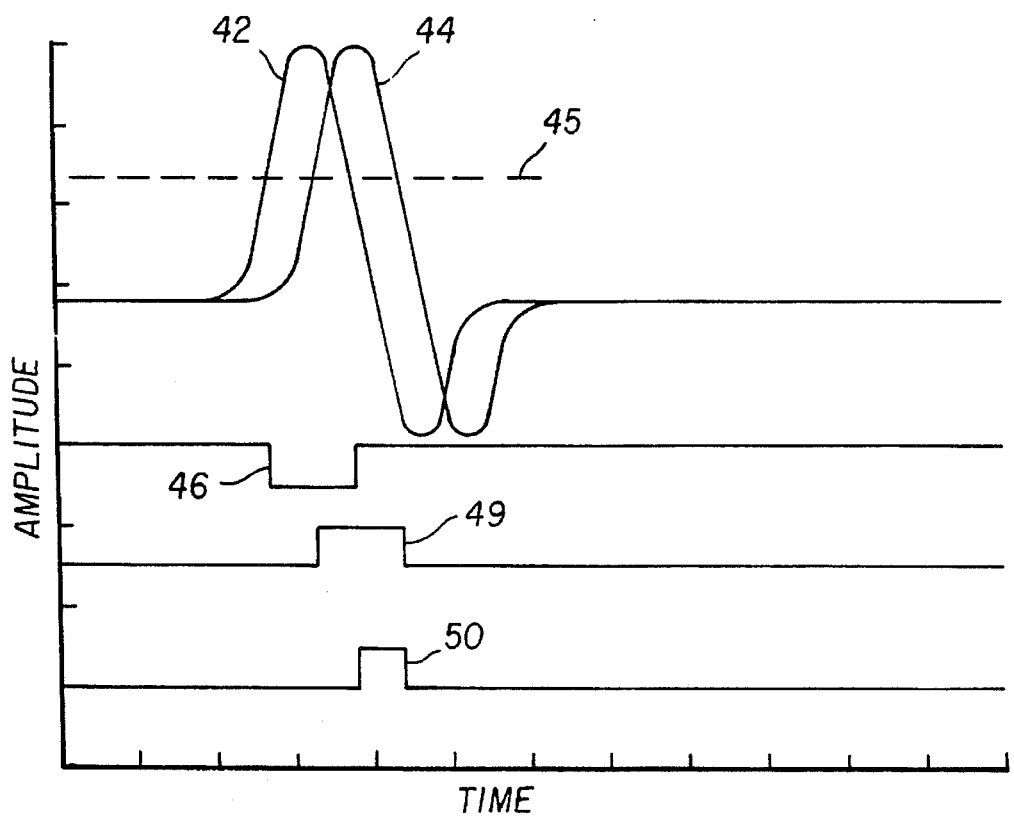
FIG. 4 is a schematic representation of output signals from the circuit of FIG. 3.
Figure 7:
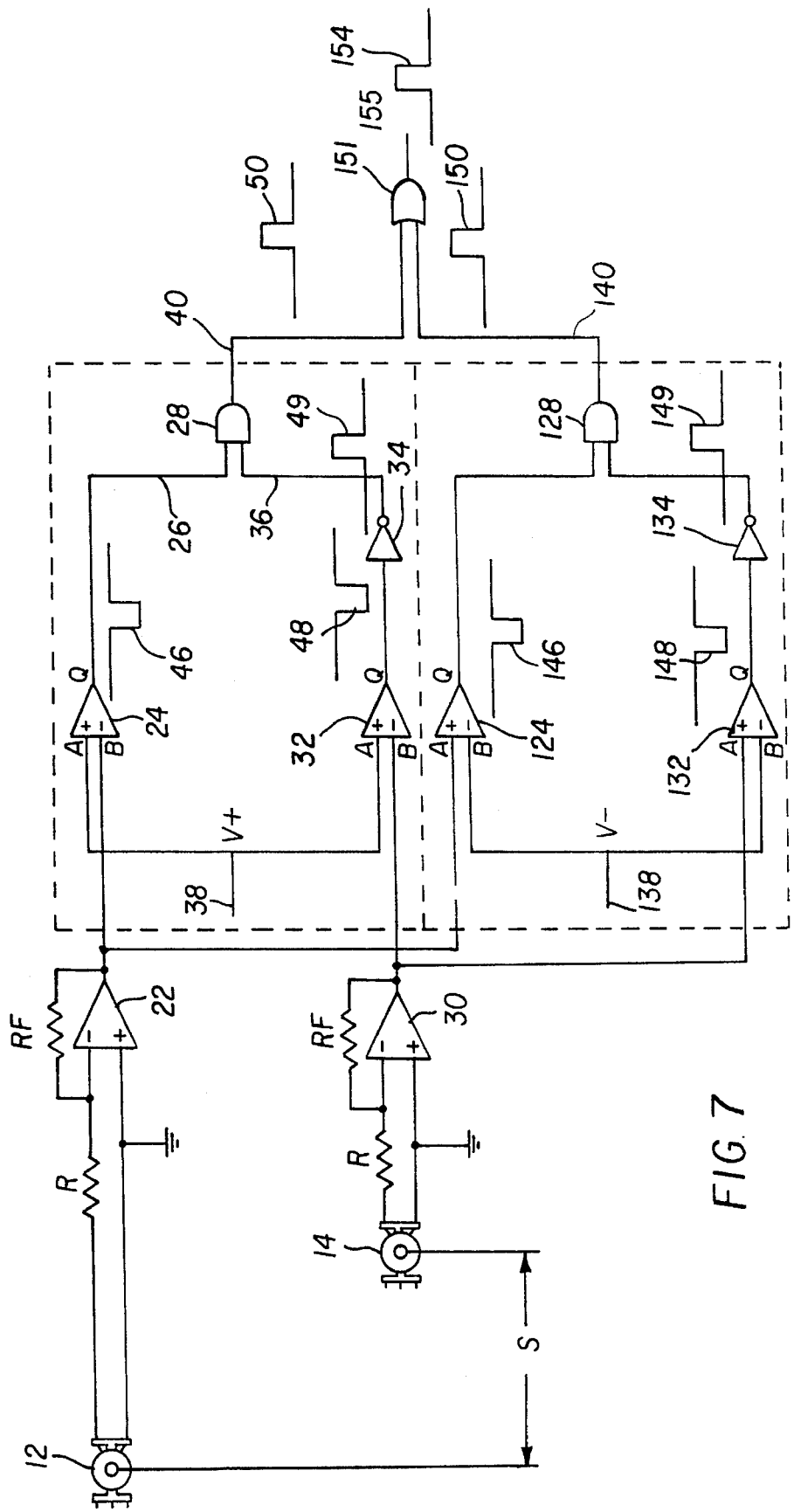
FIG. 7 is a schematic view corresponding to FIG. 3, depicting additional electrical components for detecting pulses of opposite polarity from a reversed magnetic field.

FIGS. 3 and 4 depict a preferred circuit and various outputs that would result from movement of a boat, including the circuit, past one of the magnetic buoys. Certain portions of the circuit in FIG. 3 are simplified based on the assumption that all of the magnetic fields are polarized in the same direction. FIG. 7, described hereinafter, depicts a similar circuit designed for monitoring either or both polarities to accommodate magnetic fields of unknown and mixed orientations.

The first and second sensors 12 and 14 are magnetic transducers comprising multi-turn wire coils formed around a magnetically permeable core material. Preferably the coils are mounted on the boat toward one side, the left in FIG. 2, so they will be more sensitive to the buoys in row "A" when moving to the right.

The signal generated by coil 12 is applied to amplifier 22, which provides a large low frequency gain and near zero high frequency gain. The amplifier preferably includes two stages for filtering out the high frequencies in the first stage to facilitate greater amplification of only the low frequencies in the second stage. The amplified signal is, in turn, applied as an input "B" to a threshold detector, such as comparater 24, which filters out low level signals of insufficient amplitude to have been caused by passing one of the magnetic buoys. The output "Q" of comparater 24 is high when input "A" exceeds input "B" (if A>B, then Q=1) and is low when input "B" exceeds input "A" (if B>A, then Q=0). Output "Q" thus serves to digitally register the relatively short time interval during which the amplified signal from coil 12 exceeds the threshold determined by the comparater, and is applied as one of the inputs 26 to a logical AND gate 28. The circuit described so far functions as a peak detector for determining when a magnetic-field sensor moves past the center of a magnetic field.

The signal generated by coil 14 is processed by amplifier 30, and comparater 32 in the same manner, with the same amplifier gain and amplitude threshold, as the signal from coil 12. The amplified and threshold-detected signal is logically inverted, however, at inverter 34, before it is applied as the other input 36 to gate 28.

The sensitivity of detection is adjustable by varying the reference input 38 to the comparaters 24 and 32. The threshold level may be calibrated automatically before each use by sensing and using the output of the amplifier when the system is first initialized. In the idle state, the amplifier output is equal to the vertual ground reference, and the sensitivity input 28 can be set relative to this same value.

Gate 28 provides a logical output in line 40 that is high only when the logical inputs 26 and 36 are both high. Referring to FIG. 4, the amplified outputs of coils 12 and 14 are depicted at 42 and 44, respectively. The input states in lines 26 and 36 are depicted at 46 and 49, respectively. Input 26 starts high, drops low when the amplified signal from coil 12 exceeds the threshold determined by comparator 24, and returns high when the amplified signal drops below the threshold. Input 36, on the other hand, starts low, goes high when the amplified signal from coil 14 exceeds the threshold determinedly comparator 30, and returns low when the amplified signal drops below the threshold. Logical representation 50 depicts the output in line 40 after gate 28. It switches from low to high at the trailing end of the detected signal from coil 12 (when input 26 goes high), and returns low at the trailing end of the detected signal from coil 14 (when input 36 goes low). In this manner gate 28 produces a pulse 50 equal in duration to the time displacement between the detected coil signals.

The single pulse 50 produced at the output of gate 28 is used to determine the occurance of a valid event. Pulses from invalid events will be unduly short. Simultaneous coil outputs caused by movement in the earth's magnetic field will not produce any measurable pulse in line 40.

Permissible output pulse widths in line 40 are based on expected vehicle speeds and the longitudinal distance between the sensing coils. In slalom events the permitted speeds range between sixteen and thirty six miles per hour (16 mph.–36 mph.), and the allowed tolerances are plus or minus one half of a mile an hour (+/– 0.5 mph.). Allowing for some variation, the following example assumes speeds will range between fifteen and thirty eight miles per hour (15 mph.–38 mph.). The assumed coil spacing is a distance of five inches (5 in.). Given such assumptions, the time displacement or time span between the coil outputs will produce a pulse width in line 40 between eighteen and nine tenths milliseconds (18.9 ms.) at fifteen miles per hour, and seven and one half milli seconds (7.5 ms.) at thirty eight miles per hour. Signals outside the predetermined range are rejected as invalid.

Figure 5:
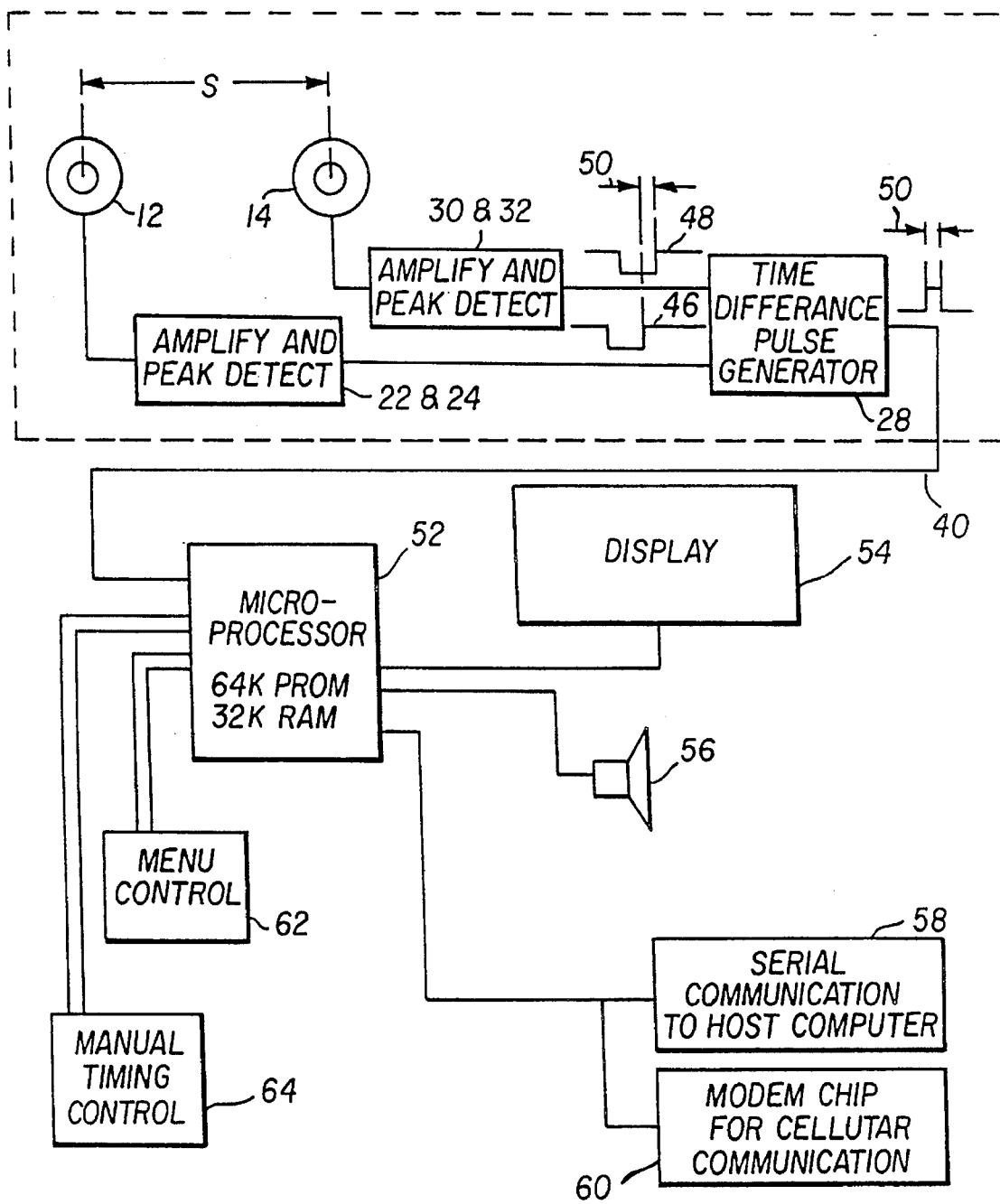
FIG. 5 is a schematic representation of a more comprehensive system including more specific features of the invention.

Referring to FIG. 5, the output line 40 from AND gate 28 is coupled to a eight bit microprocessor 52. Associated components for use with the microprocessor include a four line LCD display 54; annunciator 56 for acknowledging input signals and valid buoy detection; an RS232 serial driver 58 for communication with a host computer; a modem chip 60 for cellular communications; a menu control 62 including two input keys; and a manual timer control 64 for use in situations where manual timing is required. Also provided are sixty four kilobytes of programmable read-only memory (PROM) suitable for program code, and thirty two kilobytes of random access memory (RAM), backed up by battery power, for data storage.

The microprocessor measures the duration or width of the output pulse from gate 28 to determine if it represents a valid event. Continuing with the parameters provided in the above example, if the pulse width is between eighteen and nine tenths milliseconds (18.9 ms.) and seven and one half milli seconds (7.5 ms.), the output is accepted as representing movement of the boat past one of the magnetic buoys. Signals outside the permitted window are rejected as invalid. When the microprocessor recognizes a valid signal, it starts one or more timers for recording elapsed time until it recognizes other valid events corresponding to movement past other magnetic buoys. Three timers are indicated in FIG. 2 for measuring the elapsed time starting with the entrance buoy A1, and ending, respectively, with speed-check buoy A2, intermediate buoy A3, and exit buoy A4. A timer also is provided for measuring the elapsed time from intermediate buoy A3 to exit buoy A4. Each elapsed time is presented essentially immediately for viewing on display 54 and also is converted to speed and displayed in miles per hour or kilometers per hour. Intermediate times are displayed after passing the third buoy to permit midcourse correction before exiting the course at buoy A4. Times at buoy A2 provide an early indication of speed upon entering the course.

According to more specific features of the invention, based on knowledge of the course configuration, a look-up table is stored in memory defining elapsed time intervals or windows when subsequent buoys should be detected at the permitted boat speeds. If no buoy is detected, the microprocessor is reset on the assumption the boat stopped. The buoy window also permits a further mechanism for filtering out false triggers by disabling detection in the microprocessor until a valid window opens. The microprocessor looks for triggers only during the time interval when a valid trigger should occur at the expected speeds and buoy spacing.

Figure 6B:
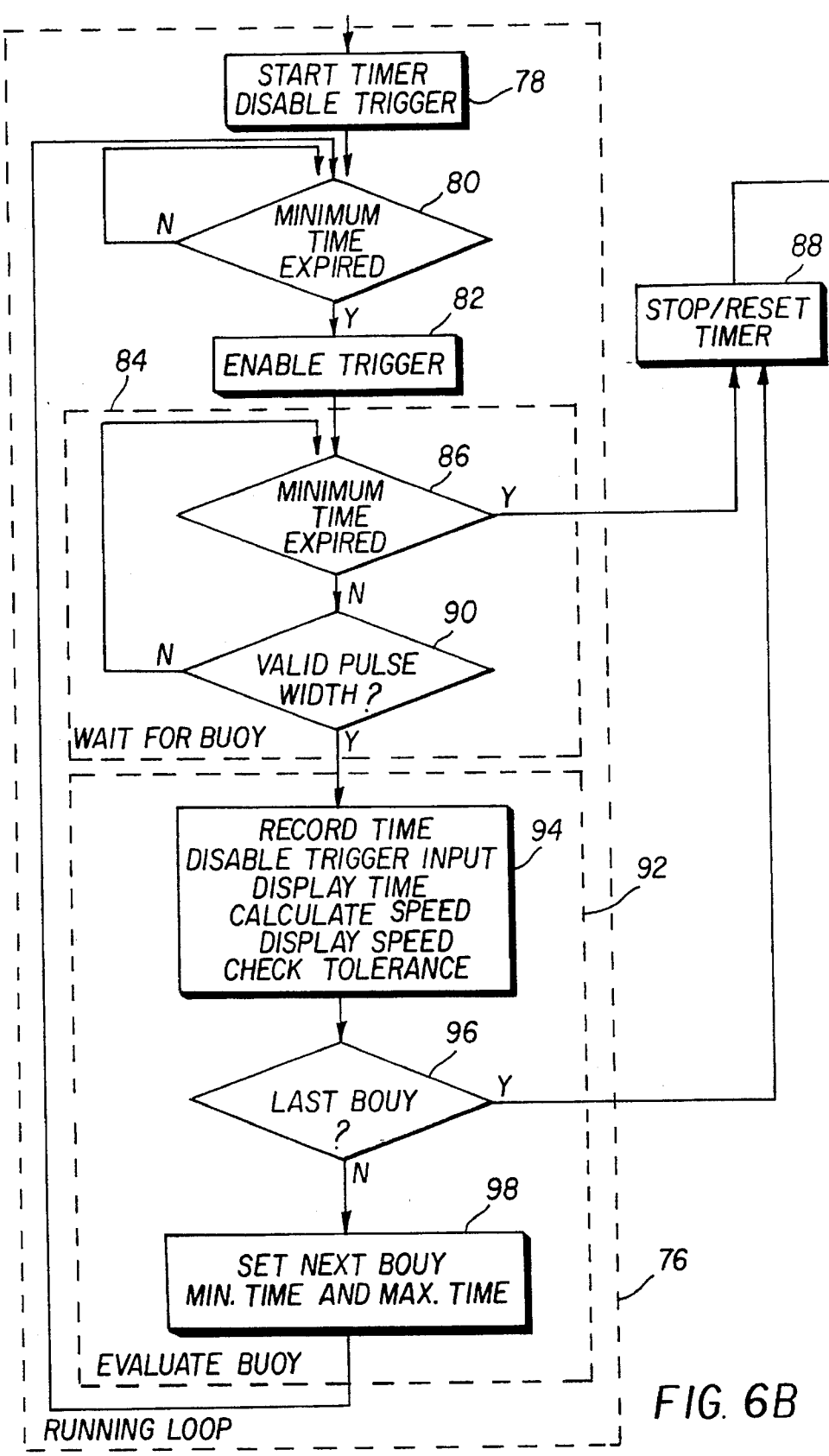
FIG. 6 is a flow diagram depicting operational steps and features according to a preferred embodiment of the of the invention.

Referring now to the flow diagram and FIG. 6, the magnetically triggered elapsed time indicator operates as follows. After initialization and calibration, the unit enters an idle loop 68 watching for an output at decision point 74 having a valid pulse width. During this idle period, a select key 70 can be depressed to provide a review of the elapsed times from prior runs. Similarly, depressing an entry key 72 will present menu options for selecting between modes of operation and other options. These features are provided by programming the microprocessor 52.

When a valid pulse is sensed at decision point 74 the unit proceeds to a running loop 76 that starts the timer and disables the timer trigger, block 78, until a predetermined minimum time passes, decision point 80, that is consistent with the minimum time required to reach the next buoy at the fastest expected speed. The timer is then enabled at 82 and waits in loop 84 for a valid output signal resulting from passing the next buoy. If the time interval exceeds the time required to reach the next buoy at the slowest expected speed, the window of valid times is exceeded, and the timer resets at 88. A valid pulse width occurring during the permitted window, on the other hand, advances the unit at decision point 90 into a buoy evaluating loop 92.

The buoy evaluating loop 92, at block 94, records the time of the valid pulse, displays the time and calculated speed, and indicates whether the speed is within, above or below the permitted tolerances. It also checks to see if the signal resulted from the final buoy, at decision point 96, and, if not, it sets the minimum and maximum times for the next expected buoy, at block 98.

FIG. 7 depicts a more complete circuit corresponding to simplified FIG. 3, but including additional elements for handling magnetic orientations of either, both or mixed polarities. The additional elements will not be described in detail, but are identified with reference numerals having the same last two digits as the corresponding elements in FIG. 3, preceded by a one in the hundreds position. Threshold reference 38 is greater than vertual ground, the idle state of the amplifiers, which is greater than threshold reference 138. When positive pulses are generated by the coils passing through a magnetic field of one polarity, the voltage level at input "B" to comparators 24 and 32 will be more positive than the threshold reference 38, causing a low output at Q (B>A, Q=0). When negative pulses are generated by an oppositely polarized magnetic field, the voltage level at input "A" of comparators 124 and 132 will be more negative than the threshold reference 138, again causing a low output (B>A, Q=0). The output signals 50 and 150, depicted on lines 40 and 140, are applied to OR gate 151. A valid output pulse 154, on line 155 leading from the OR gate, will be produced whenever there in a valid input on either line 40 or 140, and will have the same signal configuration 154 as the input signal 50 or 150. Line 155 is then used as the input to the microprocessor.

FIG. 8 depicts an alternative embodiment providing the same advantages and functions, but with fewer components. The output from spaced coils 212 and 214 is amplified, 222 and 230, and applied to open-collector comparators 238, 240, 242 and 244, each having reference threshold settings 246 and 247, and each providing an input to OR gate 248. Like the previous embodiment, threshold reference 246 is more positive than vertual ground, the idle state of the amplifiers, which is more positive than the threshold reference 247. The output of amplifier 230 is applied to the positive input of comparator 242 and the negative input of comparator 244, achieving the inversion comparable to inverters 34 and 134 in the previous embodiment. Connecting the outputs of the comparators 238, 240, 242 and 244, provides the AND function without a separate AND gate. The output 257 of the OR gate 248 corresponds to the output 154 on line 155 in the previous embodiment.

It should now be apparent that preferred and alternative embodiments have been described for accomplishing the many important features and advantages set forth earlier in this specification.

While the invention has been described with reference to preferred and alternative embodiments, certain aspects are not limited to the particular details of the examples illustrated. Modifications and other applications will occur to those skilled in the art. Accordingly, the claims are intended to cover all such modifications and applications that do not depart from the true spirit and scope of the invention.

What is claimed is:

1. Apparatus providing input to a measuring device when a moving water craft passes a magnetic marker, said apparatus comprising:

first and second transducers spaced apart on the water craft for producing first and second electrical outputs, respectively, in response to movement of the transducers in a magnetic field;

means coupled to said transducers and using a time span between said outputs for discriminating between a) outputs consistent with movement of the water craft past the marker and b) outputs inconsistent with movement of the water craft past the marker, said discriminating means rejecting simultaneous outputs caused by movement of the water craft in earth's magnetic field; and means providing said input only in response to said consistent outputs not rejected.

2. The invention of claim 1, wherein the measuring device is an elapsed time indicator and said input triggers said indicator to measure elapsed time.

3. Apparatus for triggering an elapsed time indicator when a moving water craft passes a magnetic marker, said apparatus comprising:

first and second magnetically triggered peak detectors spaced on said water craft and producing first and second outputs, respectively, in response to movement of said first and second detectors in a magnetic field; and, a discriminator coupled to said detectors and responsive to said outputs for triggering said indicator when said water craft passes the marker, said discriminator rejecting substantially simultaneous outputs caused by movement of said water craft in earth's magnetic field.

4. Apparatus for triggering a timing device when a moving water craft passes a magnetic marker, said apparatus comprising:

at least one magnetically stimulated peak detector including first and second magnetic-field sensors spaced apart on said water craft and producing first and second outputs, respectively, in response to movement of said sensors in a magnetic field; and, means responsive to said first and second outputs for triggering said timing device when said water craft moves past said marker, said triggering means rejecting substantially simultaneous spurious outputs inconsistent with movement of the water craft past the marker.

5. The invention of claim 4, wherein said sensors each include a coil and said respective outputs result from movement of said coils through a magnetic field.

6. Apparatus for issuing a timing signal when a water vehicle travels past a magnetic field centered at a fixed point, the vehicle defining a longitudinal dimension in the direction of travel, said apparatus comprising:

first and second coils carried by the vehicle and spaced apart a known distance longitudinally, said coils producing first and second output signals, respectively, substantially similar in form, in response to movement of the coils in the magnetic field past the point;

means for comparing said first and second output signals and for producing a pulse only when said first and second output signals are displaced in time; and, means for issuing said timing signal in response to said pulse.

7. The invention of claim 6, wherein said comparing means includes means providing an electrical threshold, and further includes means for producing a first logical signal having a first logical state when said first output signal exceeds said threshold and for producing a second logical signal having a second logical state inverted compared to said first logical state when said second output signal exceeds said threshold.

8. Apparatus for determining elapsed time for a moving water vehicle to travel past magnetic markers, said apparatus comprising:

first and second transducers spaced apart on the vehicle for producing first and second electrical outputs, respectively, in response to movement of said transducers in a magnetic field;

a discriminator coupled to said transducers for rejecting simultaneous spurious outputs inconsistent with movement of said vehicle past one of the markers; and, means for determining the elapsed time based only on outputs not rejected.

9. Apparatus for determining elapsed time for a moving water vehicle to travel between fixed points characterized by magnetic fields, said apparatus comprising:

at least one magnetic-field peak detector including first and second sensors carried by the vehicle and spaced apart a known distance in the direction of travel, said at least one peak detector producing first and second peak detection outputs, respectively, in response to movement of the first and second sensors in a magnetic field;

means for rejecting simultaneous outputs inconsistent with movement of the vehicle in the direction of travel, and for recording the occurrence of acceptable outputs not rejected; and, means for determining the elapsed time based on said recorded occurrences of acceptable outputs.

10. Apparatus for determining elapsed time for a moving water craft to travel between magnetic markers, said apparatus comprising:

first and second coils carried by the water craft and spaced apart a known distance in the direction of travel between the markers, said coils producing first and second outputs, respectively, in response to movement of the coils in a magnetic field;

means for rejecting substantially simultaneous outputs of said coils caused by movement of said water craft in the earth's magnetic field: and, means for determining the elapsed time based only on outputs not rejected.

11. Apparatus for determining elapsed time for a water craft moving within an expected range of acceptable speeds to travel between two magnetic markers, the water craft defining a longitudinal dimension in the direction of travel, said apparatus comprising:

paired first and second magnetic-field sensors spaced longitudinally on the water craft for producing paired first and second outputs, respectively, in response to movement of the sensors in a magnetic field past each respective one of the magnetic markers;

means for rejecting simultaneous pairs of the outputs caused by movement of the water craft in earth's magnetic field;

means for measuring the elapsed time between pairs of outputs not rejected.

12. The invention of claim 11, including means for predicting within a time window when a second acceptable pair of outputs is likely to occur, based on the occurrence of a first acceptable pair and the acceptable range of speeds, and for identifying second acceptable pairs only when they fall within said window.

13. Apparatus for determining a valid elapsed time for a moving water vehicle to travel between two fixed points characterized by separate magnetic fields, said apparatus comprising:

at least one magnetic-field peak detector including first and second sensors carried by the vehicle and spaced apart a known distance in a direction of travel, said at least one peak detector producing a first set of first and second peak detection outputs, respectively, in response to movement of the first and second sensors in the magnetic field past one of the fixed points, and a second set of first and second peak detection outputs, respectively, in response to movement of the first and second sensors in the magnetic field past the other of the fixed points;

means for rejecting sets of first and second outputs inconsistent with movement of the vehicle in the direction of travel, and for identifying sets of acceptable outputs not rejected; and, means for initiating measurement of elapsed time when a first set of acceptable outputs is identified, and for terminating the measurement of elapsed time when a second set of acceptable outputs is identified; and, means using a predetermined lower limit of the elapsed time for ignoring any outputs during measurement of the elapsed time before the lower limit.

14. The invention of claim 13, including means using a predetermined upper limit of elapsed time for resetting the apparatus when the elapsed time exceeds the upper limit.

* * * * *